United States Patent [19]

Ohji et al.

[11] Patent Number: 4,895,067

[45] Date of Patent: Jan. 23, 1990

[54] HEAT COOKING APPARATUS

[75] Inventors: Kenzo Ohji, Ikoma; Shuji Itou, Nara; Kazuho Sakamoto, Nara; Makoto Mihara, Nara, all of Japan

[73] Assignee: Matsushita Electric Industrial Co., Ltd., Osaka, Japan

[21] Appl. No.: 297,936

[22] Filed: Jan. 17, 1989

Related U.S. Application Data

[63] Continuation-in-part of Ser. No. 144,348, Jan. 15, 1988, abandoned.

[30] Foreign Application Priority Data

| | | | |
|---|---|---|---|
| Jan. 16, 1987 | [JP] | Japan | 62-8509 |
| Feb. 16, 1987 | [JP] | Japan | 62-33058 |
| Mar. 9, 1987 | [JP] | Japan | 62-53313 |

[51] Int. Cl.4 .......... A47J 27/00; H05B 6/64

[52] U.S. Cl. .......... 99/325; 177/245; 219/10.55 B; 219/10.55 F; 219/518

[58] Field of Search .......... 99/325, 326, 334; 177/245; 374/142, 149, 155; 219/10.55 B, 10.55 R, 10.55 F, 518

[56] References Cited

U.S. PATENT DOCUMENTS

| | | | |
|---|---|---|---|
| 4,520,250 | 5/1985 | Ishihara et al. | 99/325 X |
| 4,590,350 | 5/1986 | Ueda | 99/325 X |
| 4,591,684 | 5/1986 | Tanabe et al. | 99/325 X |
| 4,595,827 | 6/1986 | Hirai et al. | 99/325 X |
| 4,599,503 | 7/1986 | Ueda | 99/325 X |
| 4,673,800 | 6/1987 | Hirai et al. | 99/325 X |
| 4,703,151 | 10/1987 | Sakamoto | 99/325 X |
| 4,757,181 | 7/1988 | Sakamoto et al. | 219/10.55 B X |

FOREIGN PATENT DOCUMENTS 264935 4/1988 European Pat. Off. .

*Primary Examiner*—Harvey C. Hornsby
*Assistant Examiner*—Stephen F. Gerrity
*Attorney, Agent, or Firm*—Wenderoth, Lind & Ponack

[57] ABSTRACT

A heat cooking apparatus accurately detects minor weight variations of an article of food by detecting the weight of the article of food received on a turntable in synchronization with the position of the turntable or its rotational cycle, so as to control the cooking based on such weight variations.

7 Claims, 6 Drawing Sheets

HEAT COOKING APPARATUS

This application is a Continuation-In-Part of U.S. Appln. No. 07/144,348, filed Jan. 15, 1988 and now abandoned.

BACKGROUND OF THE INVENTION

The present invention generally relates to a heating apparatus and more particularly, to a heat cooking apparatus, for example, a microwave oven or the like provided with a weight sensor.

In a conventional heat cooking apparatus, for example, a microwave oven or the like, it has been a common practice to detect the weight of an article of food placed in a heating chamber, to thereby effect the cooking only for a predetermined period of heating time corresponding to the weight as detected. Therefore, there has been a disadvantage in that the finished state of cooked articles of food undesirably differs to a large extent from time to time.

SUMMARY OF THE INVENTION

Accordingly, an essential object of the present invention is to provide a heat cooking apparatus, for example, a microwave oven or the like, which is arranged to detect an initial weight of an article of food and variations in the weight thereof during cooking so as to control the cooking based on the weight variations for automatically effecting such cooking.

Another important object of the present invention is to provide a heat cooking apparatus of the above-described type which has a simple construction, which functions reliably and which can be readily manufactured at a low cost.

In accomplishing these and other objects, according to one preferred embodiment of the present invention, there is provided a heat cooking apparatus which includes a turntable rotatably provided for receiving an article of food to be heated thereon, a weight sensor for detecting the weight of the article of food placed on said turntable, a sensor circuit for processing output signals from the weight sensor, means for heating the article of food, and a control section for controlling the heat cooking according to output signals from the sensor circuit.

With the arrangement of the present invention as described above, an improved heat cooking apparatus has been provided having a simple constructions that substantially eliminates disadvantages inherent in the conventional heat cooking apparatus of this kind.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
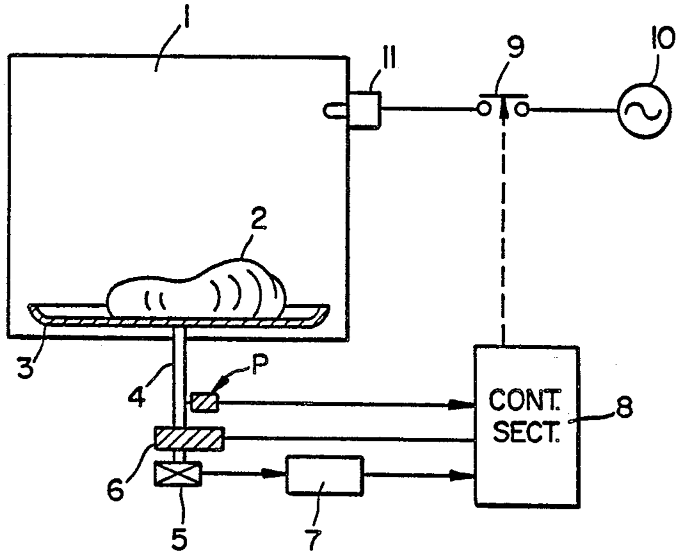
FIG. 1 is a schematic diagram showing a heat cooking apparatus according to one preferred embodiment of the present invention.

Before the description of the present invention proceeds, it is to be noted that like parts are designed by like reference numerals throughout the accompanying drawings.

Referring now to the drawings, there is schematically shown in FIG. 1 a heat cooking apparatus in the form of a microwave oven according to one preferred embodiment of the present invention, which generally includes a heating chamber 1, a magnetron 11 coupled to a power source 10 for supplying high frequency energy into the heating chamber 1, and a turntable 3 rotatably provided within said heating chamber 1 for receiving an article of food 2 to be heated thereon. The turntable 3 is supported on a weight sensor 5 through a rotary shaft. 4 which is associated with a motor 6 for driving the turntable 3. The rotational position of the turntable 3 is detected by the position sensor P, which is operatively associated with the shaft 4. The output from the weight sensor 5 is applied to a control section 8 through a sensor circuit 7. The control section 8 is arranged to selectively open or close a switch 9 according to output signals from the sensor circuit 7 so as to selectively feed the output-of the power source 10 to the magnetron 11. The weight sensor 5 may be, for example, of a type adapted to detect the capacitance between two electrodes (not particularly shown).

Figure 2:
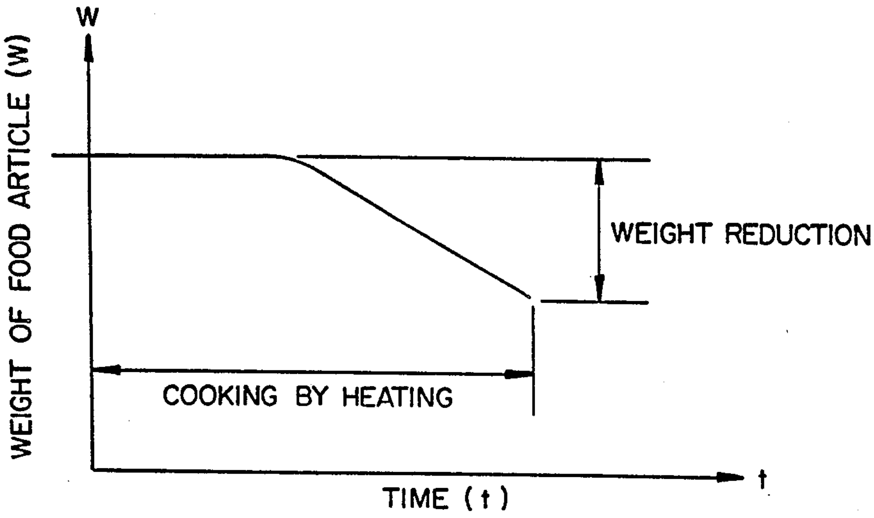
FIG. 2 is a graph illustrating the weight variation o an article of food during the cooking of the article of food.

As shown in FIG. 2, representing weight variations of an article of food subjected to cooking, during cooking, the moisture associated with the article of food generally evaporates thereby generating gas, and the weight thereof decreases with time.

Figure 3:
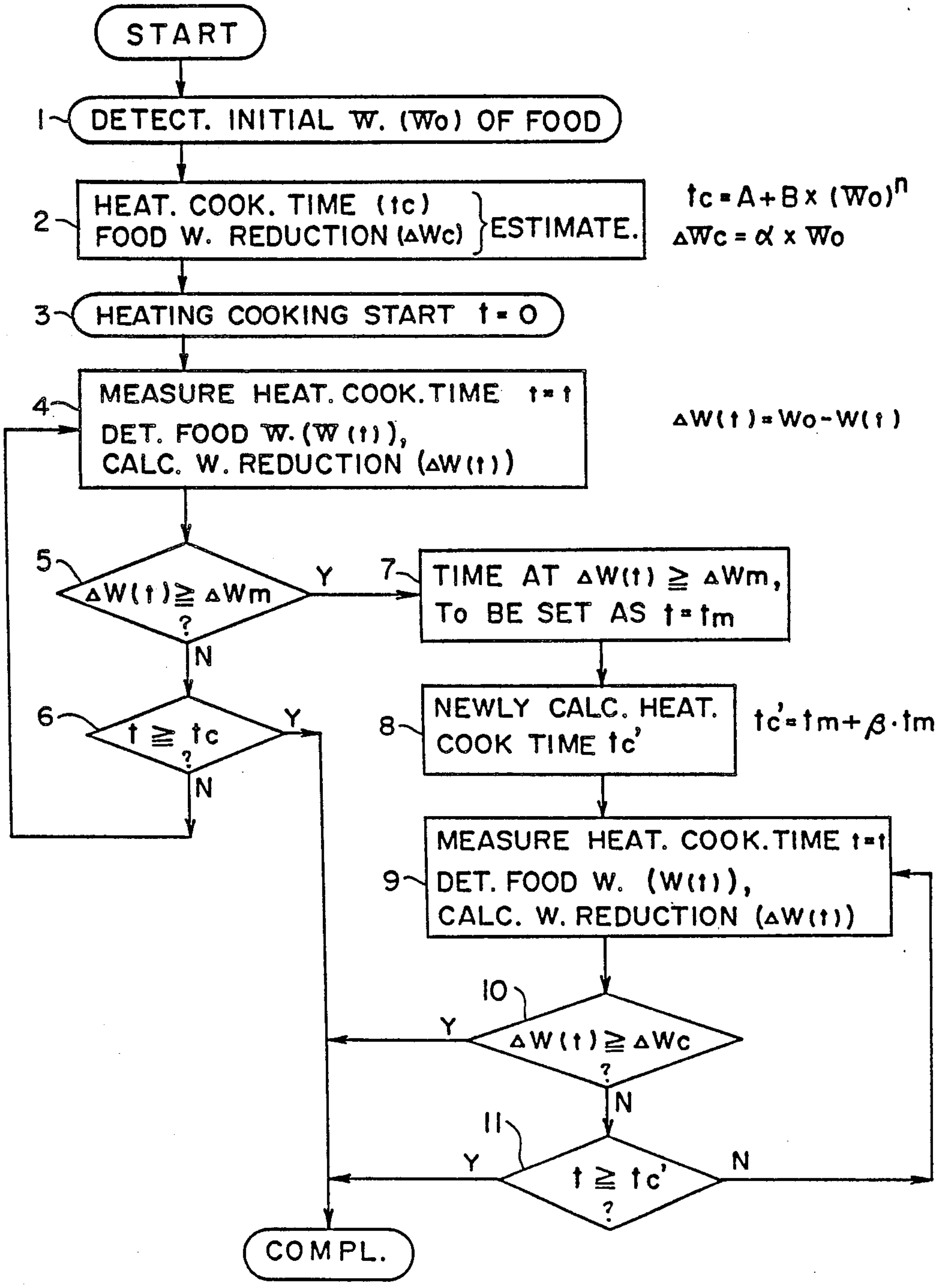
FIG. 3 is a flow-chart illustrating a sequence of cooking steps.

The function of the control section 8 during cooking will be described with reference to the flow-chart of FIG. 3.

In the first place, it is assumed that cooking has been started, with the article of food 2 disposed on the turntable 3 within the heating chamber 1.

At step (1), the control section 8 determines an initial weight Wo of the article of food 2 from the output signal issued by the sensor circuit 7. At step (2), through employment of the initial weight Wo as detected, estimated cooking time tc and an estimated weight reduction Wc are calculated from predetermined equations given below.

$$tc = A + B \times (Wo)^n \quad (1)$$

$$\Delta Wc = a \times Wo \quad (2)$$

where A, B, a, and n are, respectively, constants selected from a predetermined cooking menu ($n \simeq 1$, $0 < a < 1$).

At step (3), the cooking is started, while at step (4), the cooking time t is measured. The weight W(t) of the food article is detected, and the weight reduction ΔW(t) is calculated from an equation ΔW(t)=Wo-W(t). At step (5), it is determined whether the weight reduction ΔW(t) is larger than a predetermined value ΔWm (at about 2 g in an ordinary case). Furthermore, at step (6), a determination is made as to whether the heat cooking time t is larger than the estimated heat cooking time tc. If the determinations made at steps (5) and (6) are "NO", the operation sequence returns to step (4) to repeat steps (5) and (6) again. Meanwhile, if the determination made at step (5) is "YES", the operation sequence proceeds to step (7), and if the determination made at step (6) is "YES", the cooking time is completed. At step (7), the time when the weight variation ΔW(t) of the food article exceeds the predetermined value Wm is set as tm. At step (8), the cooking time tc' is calculated anew from the following equation (3).

$$tc' = tm + \beta . tm \quad (3)$$

where $\beta$ is a constant selected from the cooking menu (generally at $0 \leqq \beta \leqq 1$).

At step (9), the heat cooking time is measured. The weight W(t) of the article of food is detected, and the weight reduction ΔW(t) is calculated from the equation ΔW(t)=Wo-W(t). At step (10), it is determined whether the weight reduction ΔW(t) is larger than the estimated weight reduction ΔWc. At step (11), it is determined whether the heat cooking time t is larger than the newly estimated heat cooking time tc'. If either of the determinations made in steps (10) or (11) is "YES", the cooking is terminated. On the contrary, if the determinations made in steps (10) or (11) is "NO", the operation sequence proceeds to stpe (11) or returns to step (9), respectively.

As is seen from the above description, in the heat cooking apparatus according to the present invention, with the initial weight of the food article being detected, the heat cooking time corresponding to the initial weight as detected is preliminarily set, and the cooking is started. Afterwards, the weight of the article of food is detected, and by calculating the weight variation thereof, the cooking time is successively reevaluated, whereby cooking is performed in a manner in which a constant finished stated is achieved every time.

For controlling the cooking as described above, it is necessary to accurately detect the weight of the article of food with the weight sensor. In other words, the weight of the article of food placed on the turntable as shown in FIG. 1 must be accurately measured.

For facilitating such an accurate measurement, the weight sensor may detect the weight in synchronization with the rotational position of the turntable, whereby the weight variation during cooking may be accurately detected.

Figure 4A:
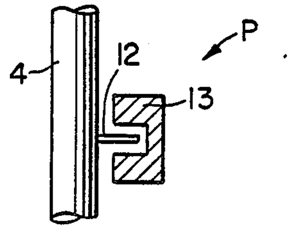
FIG. 4(A) is a fragmentary side elevational view of a rotary shaft of a turntable associated with a photo-coupler constituting a position sensor for detecting a rotational position of the turntable.
Figure 4B:
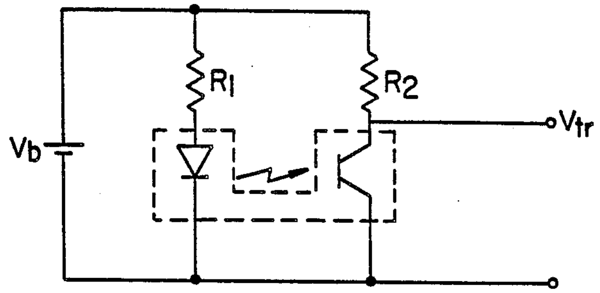
FIG. 4(B) is a circuit diagram of a photo-coupler for the position sensor.
Figure 4C:
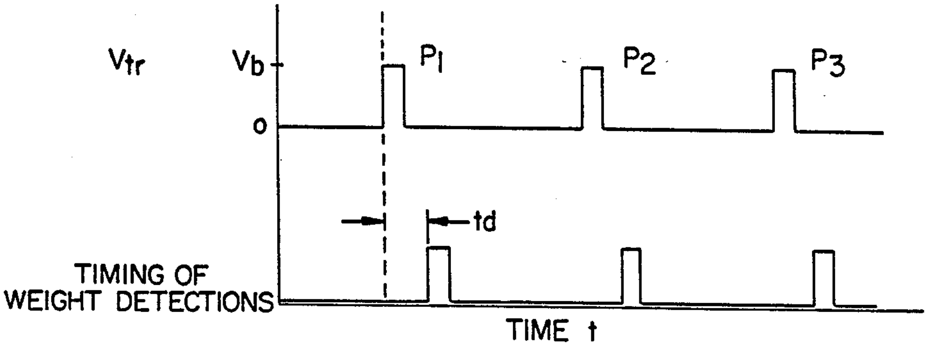
FIG. 4(C) is a timing diagram showing the output signal ($V_{tr}$) of the photo-coupler and the timing of weight detections, wherein $t_d$ is a constant delay time.

In FIG. 4(A), there is shown a position sensor P for detecting the rotational position of the turntable. FIG. 4(B) is a circuit diagram of a photo-coupler for the position sensor. $V_b$ is a bias voltage, R1 and R2 are resistors, and $V_{tr}$ is an output signal of the photo-coupler during the rotation of the turntable. The position sensor P includes a light shielding piece 12 fixed to the rotary shaft 4 and a photo-coupler 13 associated with the light shielding piece 12. When the rotary shaft 4 is rotated and the light shielding piece 12 passes through the interior of the photo-coupler 13, pulses $P_1$, $P_2$ etc. are produced from the photo-coupler 13, and upon the detection of the weight in synchronization with the pulses, as shown in FIG. 4(C) a variation of the weight value due to rotation of the turntable can be eliminated. Since the apparent weight variation in the weight of the article of food on the turntable due to the rotation of the turntable corresponds to the relative position of the turntable, if the weight is detected in synchronization with the rotation of the turntable, i.e. at the time when the turntable arrives at the same relative position during each revolution thereof, the apparent weight variation attributed to the rotation of the turntable may be discounted to a large extent. The results thereof are shown in FIGS. 5(A) and 5(B) representing the weight variation when an article of food weighing about 500 g is cooked.

Figure 5A:
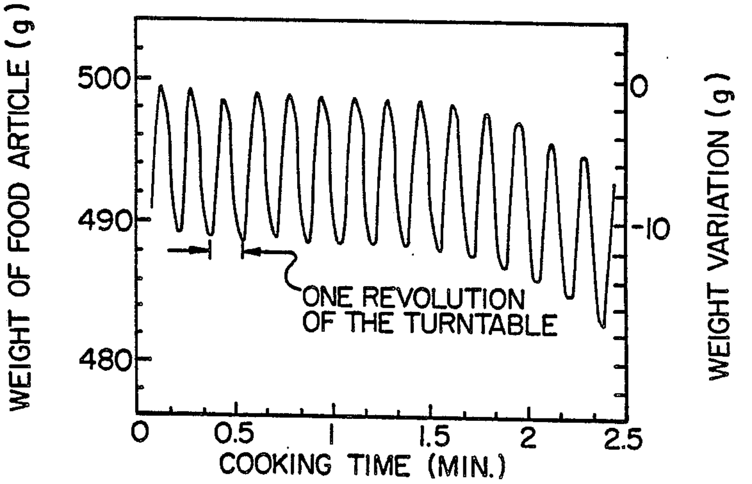
FIGS. 5(A) and 5(B) are graphs illustrating weight variations of articles of food during cooking.

FIG. 5(A) illustrates a situation in which the weight variation is continuously detected, and shows that the variation of the weight due to rotation of the turntable is approximately 10 g, and the weight reduction at the completion of cooking is about 5 g.

Accordingly, in order to detect the time at which the cooking of the article of food is completed, it is necessary to detect the weight reduction of about 5 g occurring during the cooking of the food having a weight, for example, of about 500 g during operation while there is a weight variation of about 10 g due to the rotation of the turntable. Therefore, it is required to discount the apparent weight variation of the article of food due to rotation of the turntable apparently caused by imperfections in the rotational system of the turnable.

Figure 5B:
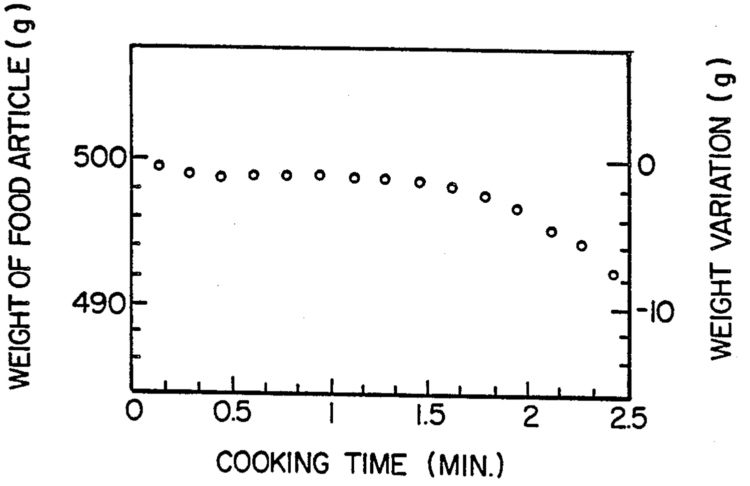

Meanwhile, FIG. 5(B) illustrates a situation in which the weight is detected in synchronization with the rotation of the turntable, with the rotational cycle of the turntable being set at 10 seconds. From FIG. 5(B), it is seen that the variation of the weight due to rotation is below 1 g and thus, variation of the weight of the food article is being accurately detected.

Moreover, it is to be noted that, when an AC synchronous motor is employed as the turntable driving motor, an effect similar to that described above can be obtained by detecting the weight value in synchronization with the rotational cycle of the rotary shaft, even without the employment of a rotational position detecting sensor as shown in FIG. 4.

Figure 6A:
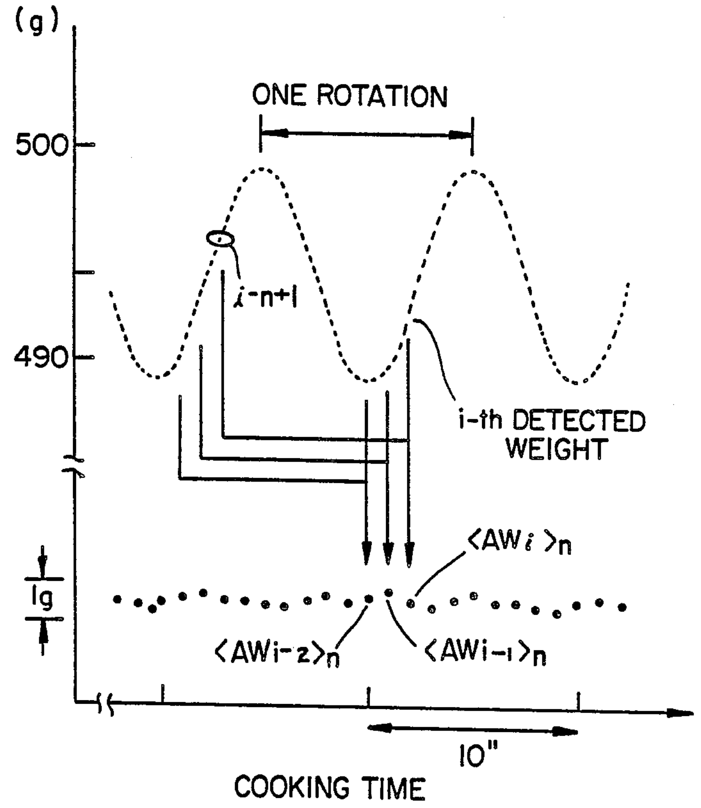
FIG. 6(A) represents FIG. 5(A) on an enlarged scale, and illustrates n successive averaging$\langle AWi \rangle_n$)
Figure 6B:
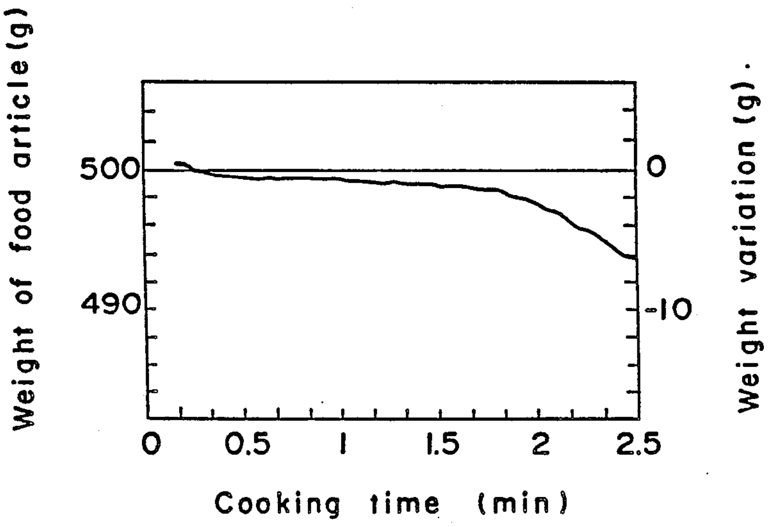
FIG. 6(B) is a graph representing the weight variation successively averaged over one rotation.

Furthermore, by detecting the weight value n times during one rotation in synchronization with the rotational cycle of the turntable. and subjecting the weight values detected n times per one rotation to successive n point averaging, the weight variation of the food article can be more accurately determined than when only employing the rotational synchronization described above. The result obtained when the weight value is detected ten times during one rotation (n=10), is shown in FIG. 6(B). The successive n point average $<AW_i>_n$, is defined as follows:

$$<AW_i>_n = \frac{1}{n} \sum_{k=i-n+1}^{i} W_k$$

where $W_k$ is the k-th detected weight of the food on the turntable. FIG. 6(B) illustrates the results when the detected weight values show in FIG. 5(A) are subjected to successive ten point averaging. It is seen that the number of weight detections illustrated in FIG. 5(B) at 1 detection/10 seconds can be significantly increased up to 10 detections/10 seconds, with a consequent improvement in accuracy.

Still further, when the weight value is detected n times during each rotation in synchronization with the rotational cycle of the turntable and successive comparisons are made the weight values detected at one rotation before, by integrating the difference, the weight variation of the article of food can be detected more accurately. In other words, the weight variation ΔW of the food article may be represented as follows.

$$\Delta W(t) = \Sigma\{W(t) - W(t-\tau)\} =$$

$$\{\Sigma W(t) - \Sigma W(t-\tau)\} =$$

$$\left\{\sum_{k=0}^{\tau} W(k) + \sum_{k=\tau}^{t-\tau} W(k) + \sum_{k=t-\tau}^{t} W(k)\right\} -$$

$$\sum_{k=\tau}^{t} W(k-\tau) =$$

$$\left\{\sum_{k=0}^{\tau} W(k) + \sum_{k=\tau}^{t-\tau} W(k) + \sum_{k=t-\tau}^{t} W(k)\right\} -$$

$$\left\{\sum_{k=0}^{\tau} W(k) + \sum_{k=\tau}^{t-\tau} W(k)\right\} =$$

$$\sum_{k=t-\tau}^{t} W(k) = n \times \langle AW_t \rangle_n$$

where $\tau$ is the rotational cycle and $$\langle AW_t \rangle_n = \frac{1}{n} \sum_{k=t-\tau}^{t} W(k)$$

The weight variation ΔW(t) at a certain time t is represented by successive addition of the weight value W(t) at that time t and the difference of the weight value $W(t-\tau)$ at one rotation before.

Figure 7:
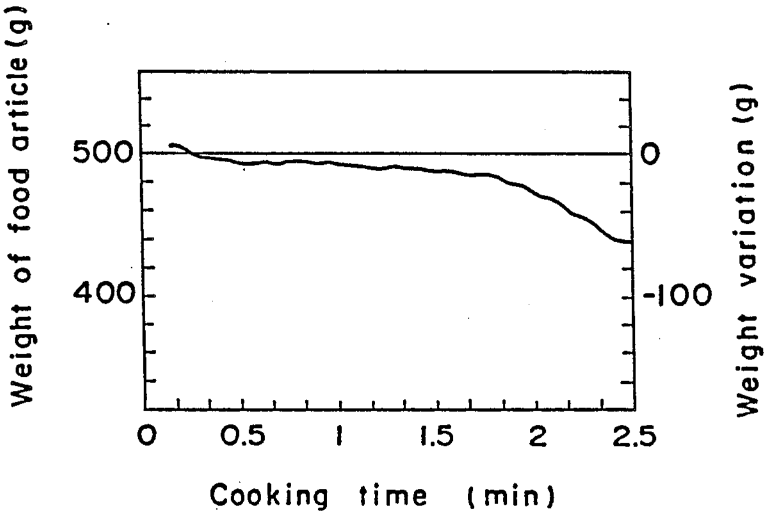
FIG. 7 is a graph which shows a comparison of the weight variation with weight values detected at one rotation before.

FIG. 7 shows the results when values shown in FIG. 5(A) are processed in the manner described above. It will be seen from FIG. 7 that the weight variation is seemingly enlarged by n times (n=10 in this case) thereby facilitating the improvement in accuracy.

It should be noted here that in the embodiment above, although the present invention is mainly described with reference to a microwave oven, the application of the concept of the present invention is not limited to such a microwave oven, but may be readily applied to other known heat cooking apparatus such as an electric oven, gas oven and the like.

As is clear from the foregoing description, according to the cooking apparatus of the present invention, since the initial weight of the food article and weight variation thereof during cooking is detected to control the cooking based on the weight variation, the cooking may be automatically effected in an efficient manner that provides a predetermined finished state of the article of food every time the apparatus is employed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless otherwise departing therefrom.

We claim:

1. A cooking apparatus comprising:

a turntable rotatably mounted in the apparatus, and drive means operatively connected to said turntable for rotating said turntable, a weight sensor operatively connected to said turntable for detecting the weight of food disposed in the apparatus on said turntable, and for issuing signals corresponding to the weight detected;

cooking means for heating food disposed in the apparatus on said turntable; and control means operatively connected to said weight sensor and said cooking means for receiving the signals issued by said weight sensor while food disposed in the apparatus on said turntable is heated, for calculating changes in the weight of the food as the food is heated based on the signals issued, and for controlling said heating means to heat the food to a temperature based on the calculated changes in the weight of the food during the heating thereof.

2. A cooking apparatus as claimed in claim 1, and further comprising synchronization means operatively connected to said turntable and said control means for determining a relative rotational position of said turntable during the rotation thereof and for causing said control means to calculate the changes in the weight of the food based on the signals that are issued by said weight sensor in synchronization with the relative rotational position of said turntable.

3. A cooking apparatus as claimed in claim 2, wherein said weight sensor detects the weight of the food n times after each time the turntable has reached the relative rotational position, and said control means calculates the change in the weight of the food by performing a successive n point averaging calculation defined by $$\langle AW_i \rangle_n = \frac{1}{n} \sum_{k=i-n+1}^{i} W_k$$

wherein $W_k$ is the k-th detected weight of the food.

4. A cooking apparatus as claimed in claim 2, wherein said weight sensor detects the weight of the food n times after each time the turntable has reached the relative rotational position, and said control means calculates the change in the weight of the food at a particular time by performing a successive comparison of the detected weight values defined by $$\sum_{k=t-\tau}^{t} W(k)$$

wherein $\tau$ is the rotational cycle based on when the turntable has reached the relative rotational position, and W(k) is the k-th detected weight of the food.

5. A cooking apparatus as claimed in claim 1, wherein said control means calculates the weight of the food based on the signals that are issued by said weight sensor in synchronization with the rotation of said turntable by said drive means.

6. A cooking apparatus as claimed in claim 5, wherein said weight sensor detects the weight of the food-n times during every rotation cycle of the turntable, and said control means calculates the change in weight of the food by performing successive n point averaging defined by $$<AW_i>_n = \frac{1}{n} \sum_{k=i-n+1}^{i} W_k$$

wherein $W_k$ is the k-th detected weight of the food.

7. A cooking apparatus as claimed in claim 5, wherein said weight sensor detects the weight of the food n times during each rotational cycle of the turntable, and said control means calculates the change in the weight of the food at a particular time t by performing a successive comparison of the detected weight values defined by $$\sum_{k=t-\tau}^{t} W(k)$$

wherein $\tau$ is the rotational cycle of the turntable, and W(k) is the k-th detected weight of the food.

* * * * *